United States Patent
Shajii et al.

(10) Patent No.: US 7,174,263 B2
(45) Date of Patent: Feb. 6, 2007

(54) EXTERNAL VOLUME INSENSITIVE FLOW VERIFICATION

(75) Inventors: Ali Shajii, Canton, MA (US); Daniel Alexander Smith, North Andover, MA (US)

(73) Assignee: MKS Instruments, Inc., Wilmington, MA (US)

( * ) Notice: Subject to any disclaimer, the term of this patent is extended or adjusted under 35 U.S.C. 154(b) by 0 days.

(21) Appl. No.: 11/090,120

(22) Filed: Mar. 25, 2005

(65) Prior Publication Data

US 2006/0217903 A1  Sep. 28, 2006

(51) Int. Cl.
*G01F 1/12* (2006.01)
*G01F 1/50* (2006.01)
*G01F 25/00* (2006.01)
*G01L 27/00* (2006.01)

(52) U.S. Cl. .............. 702/100; 73/3; 73/199; 73/861; 73/865; 702/113; 702/114; 702/115

(58) Field of Classification Search .......... 702/100; 73/1.16
See application file for complete search history.

(56) References Cited

U.S. PATENT DOCUMENTS 5,684,245 A * 11/1997 Hinkle .................. 73/1.35
6,955,072 B2 * 10/2005 Zarkar et al. ............... 73/1.36
2004/0261492 A1  12/2004 Zarkar et al.

OTHER PUBLICATIONS

MKS INSTRUMENTS, INC., Gas Box Rate-Of-Rise In Situ Flow Verifier the GBROR™, Bulletin GBROR-Aug. 1999, 6 pp.
MKS INSTRUMENTS, INC., Tru-Flow Mass Flow Verifier™ Model GBR3A, Bulletin Tru-Flo-May 2001, 4 pp.
PCT International Search Report for related Application No. PCT/US2006/07711, (2 pages).
PCT Written Opinion of the International Searching Authority for related PCT Application No.: PCT/US2006/07711, (5 pages).

* cited by examiner

*Primary Examiner*—John Barlow
*Assistant Examiner*—Sujoy Kundu
(74) *Attorney, Agent, or Firm*—McDermott Will & Emery LLP

(57) ABSTRACT

A flow verifier for in-situ verification of a device under test (DUT), including an inlet connectable to a DUT, an outlet connectable to a vacuum pump for drawing gas through the DUT and the flow verifier, a vessel having a predetermined volume, diffusive media connecting the inlet to the vessel, an outlet valve connecting the vessel to the outlet for controlling flow from the vessel to the outlet, at least one temperature sensor operatively connected to the vessel for providing temperature measurements from within the vessel, and a pressure transducer operatively connected to the vessel for providing pressure measurements from within the vessel.

20 Claims, 4 Drawing Sheets

EXTERNAL VOLUME INSENSITIVE FLOW VERIFICATION

FIELD OF THE DISCLOSURE

The present disclosure relates generally to semiconductor processing equipment and, more particularly, to a flow verifier for verifying the flow produced by a device under test. Even more particularly, the present disclosure relates to an in-situ flow verifier that is completely substantially insensitive to the size and type of the external (connecting) volume located between the verifier and the device under test.

BACKGROUND OF THE DISCLOSURE

The fabrication of a single semiconductor device can require the careful synchronization and precisely measured delivery of as many as a dozen gases to a process chamber. Various recipes are used in the fabrication process, and many discrete processing steps where a semiconductor device is cleaned, polished, oxidized, masked, etched, doped, metalized, etc., for example, may be required. The steps used, their particular sequence, and the materials involved, all contribute to the making of a semiconductor device.

Wafer fabrication facilities are commonly organized to include areas in which gas manufacturing processes, such as chemical vapor deposition, plasma deposition, plasma etching, and sputtering, are carried out. The processing tools, be they chemical vapor deposition reactors, vacuum sputtering machines, plasma etchers or plasma enhanced chemical vapor deposition, are supplied with various process gases. The process gases are supplied to the tools in precisely metered quantities.

In a typical wafer fabrication facility the gases are stored in tanks, which are connected via piping or conduit to a gas box. The gas box delivers precisely metered quantities of pure inert or reactant gases from the tanks of the fabrication facility to a process tool. The gas box, or gas metering system, includes a plurality of gas paths having gas metering units, such as valves, pressure regulators and pressure transducers, mass flow controllers (MFC), and mass flow meters (MFM).

It is desirable and often times necessary to test, or verify, the accuracy of an MFC or an MFM. One way to verify an MFC or MFM is through a "rate-of-rise" (ROR) flow verifier. Referring to FIGS. 1 and 2, an exemplary embodiment of a ROR flow verifier 100 of the prior art is shown. In FIG. 1, the flow verifier 100 is shown connected between a gas manifold 122 and a vacuum pump 124 of a gas metering system 120. The gas metering system 120 also includes a plurality of MFCs 126 controlling the flow of gas through lines connected to the gas manifold 122, and the gas manifold 122 is connected to a process chamber 128. In the exemplary embodiment of FIG. 1, the system 120 includes four lines connected to the gas manifold 122 and having MFCs 126. The system, however, can include more or less than four lines, as desired. First and second on/off type valves 130, 132 alternately control flow from the manifold 122 to either the process chamber 128 or the flow verifier 100. Gate valves 134, 136 connect the vacuum pump 124 to the process chamber 128 and the flow verifier 100.

The flow verifier 100 is used to verify and, if desired, calibrate the rate of flow produced by the MFCs 126, either individually or in combination. As shown in FIG. 2, the apparatus 100 includes an inlet 114 connectable to a DUT, and an outlet 116 connectable to a vacuum pump for drawing gas through the DUT and the flow verifier. The verifier 100 also includes a vessel 102 having a predetermined volume, an "upstream" or first valve 104 controlling flow between the inlet 114 and the vessel 102, a "downstream" or second valve 106 controlling flow from the vessel 102 to the outlet 116, and a vessel pressure measurement device 108 communicating with the volume of the vessel 102. The flow verifier 100 may also include a bypass valve 110 controlling direct flow between the inlet 114 and the outlet 116 and in parallel with the valves 104, 106, the vessel 102 and the pressure transducer 108, as shown.

A computer controller 112 of the flow verifier 100 utilizes the ROR method of flow verification, which is illustrated in FIG. 3 by the graph of pressure (P) versus time (t). In general, the controller 112 is a computer processor that includes electronic memory and a clock. The controller 112 is generally programmed so that, during operation, the controller 112 first closes the bypass valve 110 and opens the first and the second valves 104, 106 so that flow is bypassed from the manifold 122 and through the vessel 102. The controller 112 is further programmed so that, after an initialization period to allow the bypassed flow to stabilize, the second valve 106 is closed to stop flow from the vessel 102. As the closed vessel 102 is filled with gas from the manifold, the controller 112 receives measurements of vessel pressure from the pressure measurement device 108, receives measurements of time from its clock, and determines a rate of change in vessel pressure due to the gas flow. The controller 112 then determines an actual flow provided by the MFC 126 connected to the manifold 122 using the rate of change in vessel pressure and the known volume of the vessel 102. The graph of FIG. 3 illustrates how the gas flow rate can be calculated by the controller 112 from the change in pressure over time ($\Delta P/\Delta t$) in the known volume of the vessel 102.

After the flow measurement is made, the first valve 102, shown in FIG. 2, is closed and the second valve 106 is opened to purge the vessel 102 with the vacuum pump 124. After purging, the second valve 106 is closed and the bypass valve 110 is opened to allow normal flow between the manifold 122 and the vacuum pump 124.

The flow verifier 100 can comprise, for example, a GBROR® in-situ flow verifier or a Tru-Flo® in-situ flow verifier, both of which are provided by MKS Instruments of Wilmington, Mass. (http://www.mksinst.com). The GBROR® is a modular gas path, or stick, and includes the valves, the pressure vessel, the pressure transducer and the controller mounted on a manifold. The GBROR® and the Tru-Flo® flow verifiers are both process transparent, i.e., operate between the normal processing steps of the gas delivery system, and thus reduce processing tool down time. The pressure measurement device 108 can comprise, for example, a Baratron® brand pressure transducer, which is also available from MKS Instruments.

One problem associated with such ROR flow verifiers are measurement errors resulting from a connecting flow path volume ("external volume") between the DUT and the ROR flow verifier, when the ROR flow verifier is not close-coupled to the DUT. An example of "external volume" is shown in FIG. 1 between the MFCs 126 and the flow verifier 100. When gas is flowing, there is a resulting pressure drop in the external volume upstream of the ROR flow verifier 100. This pressure drop causes flowing gas to have a greater density in the upstream external volume than in the volume-calibrated chamber 102 of the ROR flow verifier 100. The higher density in the upstream external volume causes an inaccurate pressure measurement in the volume-calibrated chamber 102 of the flow verifier 100, thereby causing ah error in the gas flow rate as detected by the flow verifier.

A time-consuming setup calibration is normally necessary to cope with large external volumes when using existing ROR flow verifiers where detailed and accurate information about the upstream plumbing and type are necessary. In addition, existing ROR flow verifiers require a vessel having a relative large volume (e.g., 200–2000 cc), which may prevent the flow verifiers from being installed in-situ in compact gas process delivery lines.

What is still desired is a new and improved flow verifier for verifying and, if desired, calibrating flow control devices in a gas metering system. Preferably, the new and improved flow verifier will employ the ROR method to verify flow. In addition, the new and improved flow verifier will preferably provide in-situ verification of flow control devices, so that the verification does not require removal of the flow control devices from the gas metering system. The new and improved, in-situ flow verifier will preferably be relatively small in size, and provides relatively fast and accurate flow measurements. Furthermore, the new and improved, in-situ flow verifier will preferably be substantially insensitive to the size of the external (connecting) volume located between the verifier and the device under test.

SUMMARY OF THE DISCLOSURE

The present disclosure provides a flow verifier for verification of a device under test (DUT). One exemplary embodiment of the present disclosure includes an inlet connectable to a DUT, an outlet connectable to a vacuum pump for drawing gas through the DUT and the flow verifier, a vessel having a predetermined volume, diffusive media connecting the inlet to the vessel, an outlet valve connecting the vessel to the outlet for controlling flow from the vessel to the outlet, at least one temperature sensor operatively connected to the vessel for providing temperature measurements from within the vessel, and a pressure transducer operatively connected to the vessel for providing pressure measurements from within the vessel.

Among other aspects and advantages, the new and improved, in-situ flow verifier of the present disclosure is substantially insensitive to the size of the external (connecting) volume located between the verifier and the device under test. In addition, the new and improved, in-situ flow verifier of the present disclosure is relatively small in size, and provides relatively fast and accurate flow measurements.

The present disclosure also provides a method for in-situ verification of a device under test (DUT). The method includes connecting a vessel having a predetermined volume between the DUT and a vacuum pump, diffusing flow between the vessel and the DUT, operating the vacuum pump such that gas is drawn through the DUT and the vessel, providing the DUT with a flow set point and allowing flow and pressure within the vessel to reach a steady state, and stopping flow between the vessel and the vacuum pump. The method further includes recording temperature and pressure measurements T, P within the predetermined volume of the vessel at time t=0, recording temperature and pressure measurements T, P within the predetermined volume of the vessel at predetermined intervals until time t=N, calculating a time derivative of the vessel pressure divided by the vessel temperature, $\Delta(P/T)/\Delta t$, based on the temperature and pressure measurements within the predetermined volume of the vessel from t=0 to t=N, and calculating a flow rate produced by the DUT based upon the time derivatives of temperature and pressure within the predetermined volume of the vessel from t=0 to t=N.

These and other features and advantages of the present disclosure will become more apparent to those of ordinary skill in the art after having read the following detailed descriptions of exemplary embodiments, which are illustrated in the attached drawing figures.

BRIEF DESCRIPTION OF DRAWINGS

Like reference characters designate identical or corresponding components and units throughout the several views.

DETAILED DESCRIPTION OF DISCLOSURE

Figure 1:
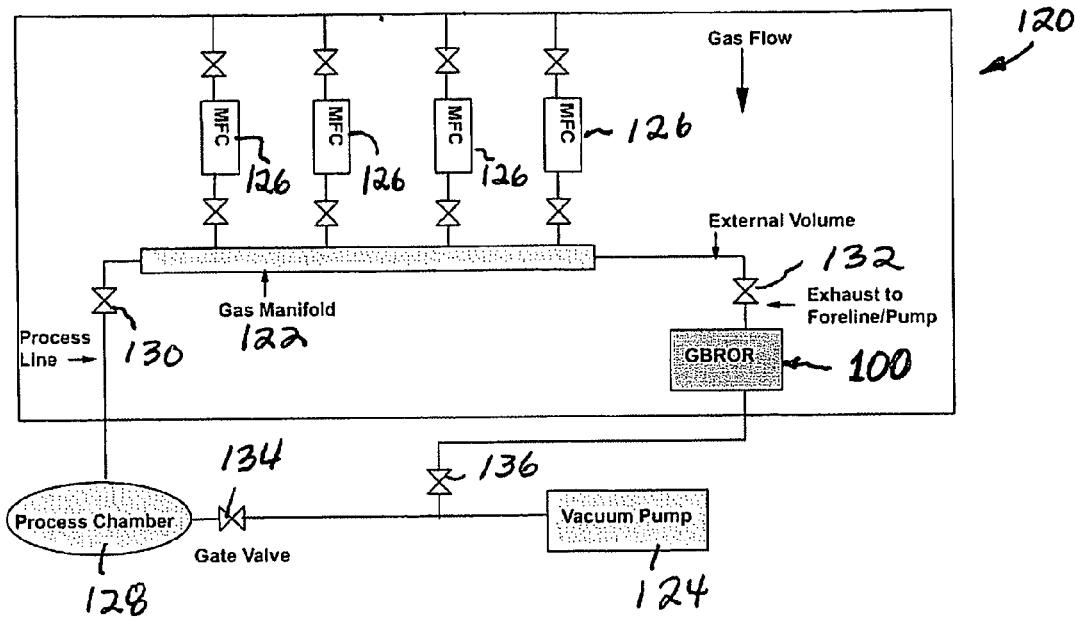
FIG. 1 is a block diagram of a gas delivery system including an exemplary embodiment of a Rate-of-Rise (ROR) flow verifier according to the prior art.
Figure 2:
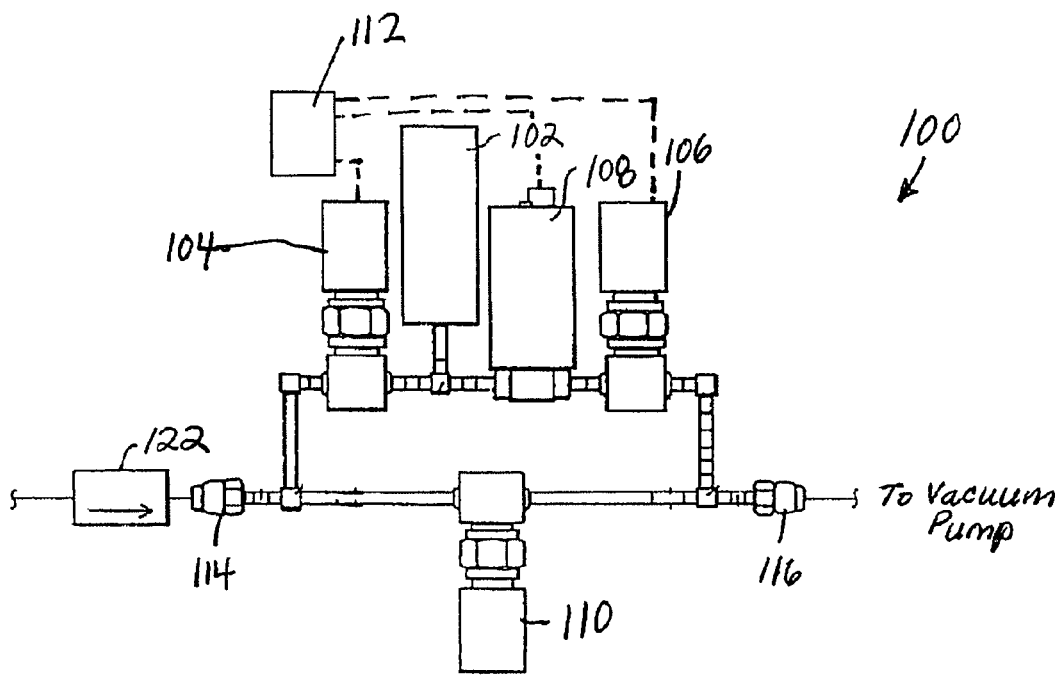
FIG. 2 is a side elevation view of the flow verifier of FIG. 1.
Figure 3:
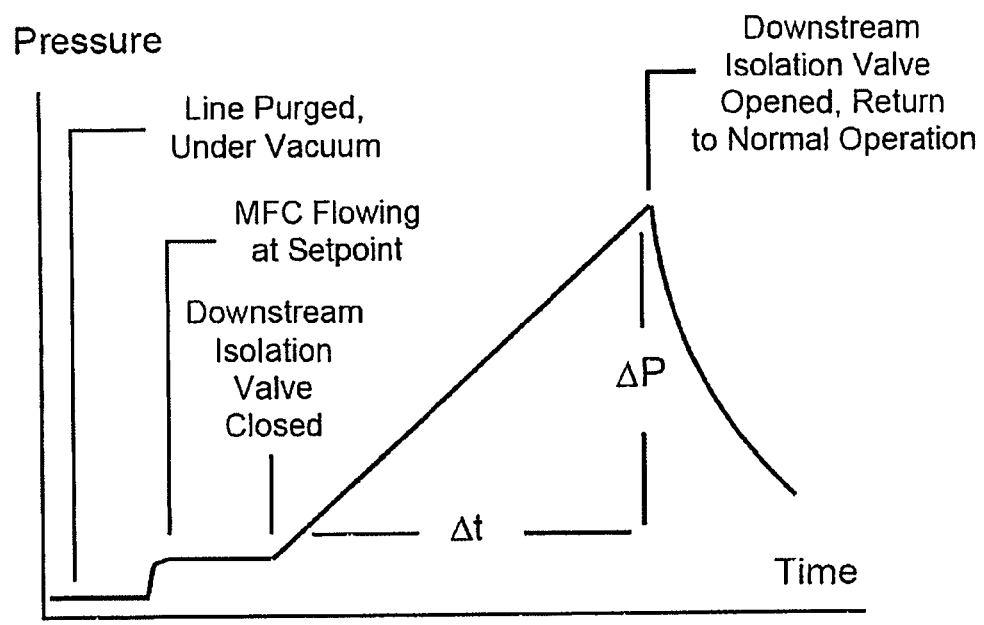
FIG. 3 is a graph of pressure versus time, illustrating a ROR flow verification method according to the prior art as conducted by the verifier of FIGS. 1 and 2.
Figure 4:
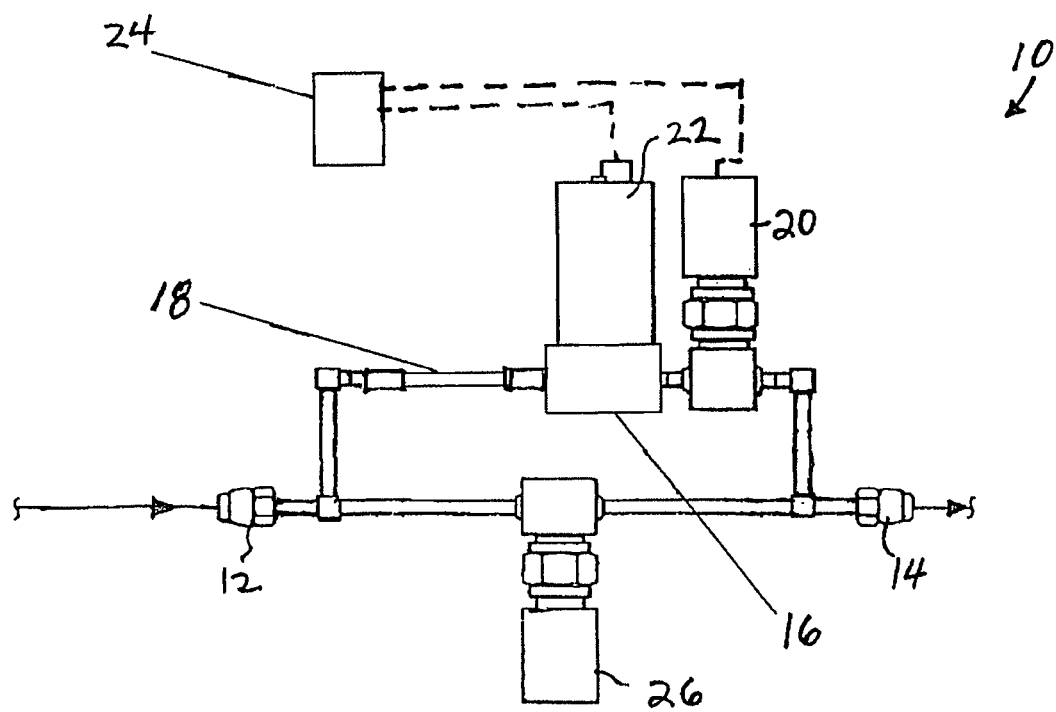
FIG. 4 is a side elevation view of an exemplary embodiment of a flow verifier constructed in accordance with the present disclosure.
Figure 5:
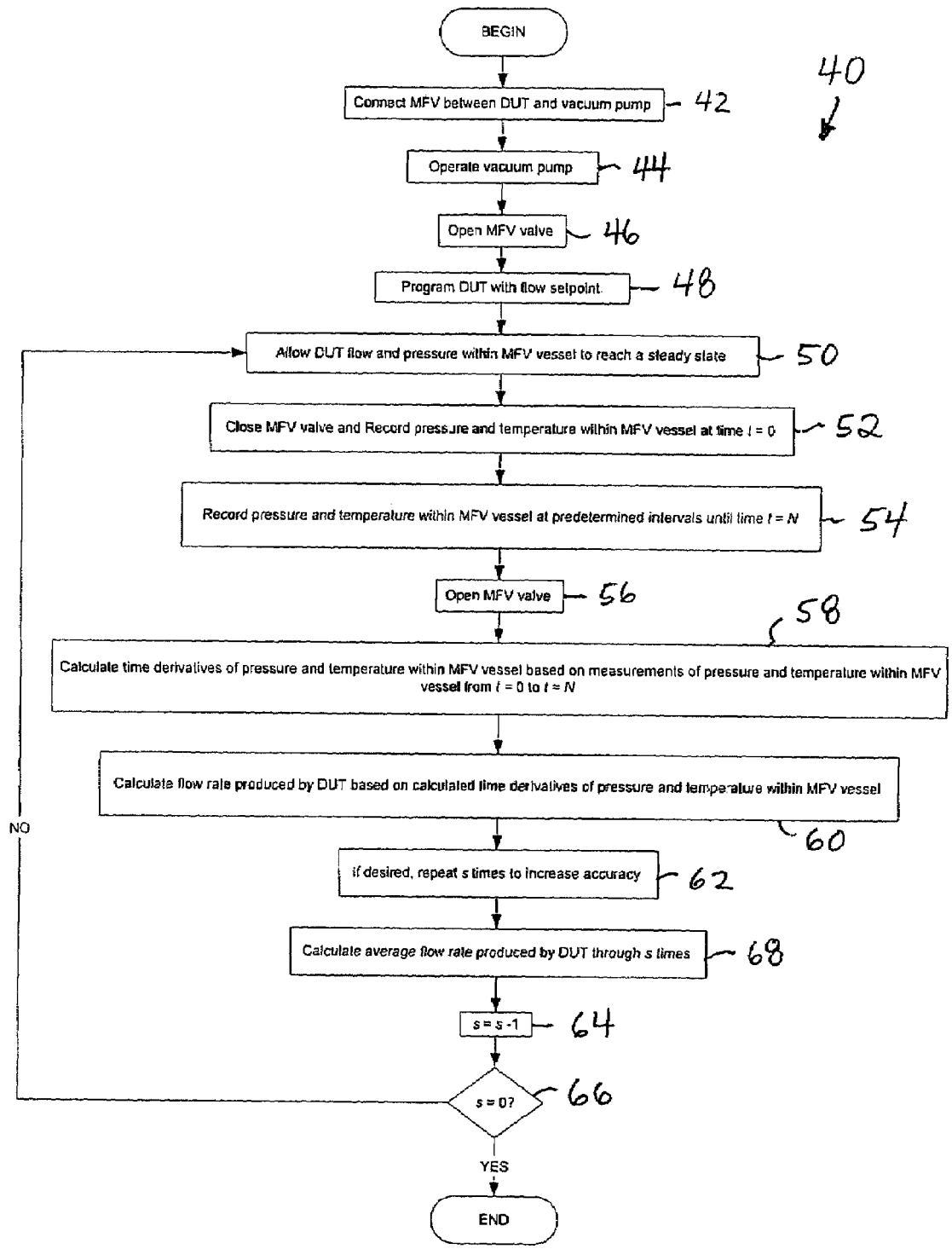
FIG. 5 is a flow chart illustrating an exemplary embodiment of a method according to the present disclosure of verifying flow as conducted by the flow verifier of FIG. 4.

The present disclosure provides a rate-of-rise (ROR) mass flow verifier 10 and a method 40 for in-situ ROR mass flow verification and, if desired, calibration of a device-under-test (DUT), such as a mass flow controller (MFC). FIG. 4 shows an exemplary embodiment of the flow verifier 10 of the present disclosure, while FIG. 5 shows an exemplary embodiment of the method 40 of the present disclosure. The flow verifier 10 and method 40 of the present disclosure are particularly for use with gas metering systems for delivering contaminant-free, precisely metered quantities of process and purge gases to a semiconductor process chamber(s). The flow verifier 10 and method 40 provide in-situ verification of DUTs, and are substantially insensitive to the size of external (connecting) volumes.

Referring to FIG. 4, the exemplary embodiment of the mass flow verifier 10 includes an inlet 12 connectable to a DUT, and an outlet 14 connectable to a vacuum pump for drawing gas through the DUT and the flow verifier 10. The flow verifier 10 also includes a vessel 16 having a predetermined volume, diffusive media 18 connecting the inlet 12 to the vessel 16, and an outlet valve 20 connecting the vessel 16 to the outlet 14 for controlling flow from the vessel to the outlet. At least one temperature sensor (not shown in drawings) is operatively connected to the vessel 16 for providing temperature measurements from within the vessel, and a pressure transducer 22 is operatively connected to the vessel 16 for providing pressure measurements from within the vessel.

The diffusive media 18 blocks out all information about the connecting plumbing (i.e., external volume) between the flow verifier 10 and the DUT. By "diffusive" it is meant that a diffusion time coefficient along an axial length of the media 18 is much greater than the response time of the pressure transducer 20. According to one exemplary embodiment, the diffusive media comprises a capillary (i.e., long and thin) tube. Alternatively, the diffusive media can comprise a porous plug or a plurality of spaced flow restrictors connected in series, for example.

The pressure transducer 22 can comprise, for example, a Baratron® brand capacitance manometer, which is also available from MKS Instruments.

According to one exemplary embodiment, the at least one temperature sensor operatively connected to the vessel 16 for providing temperature measurements from within the vessel comprises two or more temperature sensors adapted to provide an average temperature measurement from within the vessel.

Still referring to FIG. 4, the exemplary embodiment of the flow verifier 10 further includes a computer controller 24 connected to the temperature sensor, the pressure transducer and the valve and including a timer. The computer controller 24 can utilize digital signal processing and is programmed to operate the flow verifier 10 in accordance with the method 40 of the present disclosure for in-situ ROR flow verification.

Referring to FIG. 5, one exemplary embodiment of the method 40 of the present disclosure includes first connecting the mass flow verifier 10 (referred to as MFV in FIG. 5) between the DUT and the vacuum pump, as shown at 42, operating the vacuum pump, as shown at 44, and the MFV valve 20 is opened, as shown at 46. Then the DUT is provided with a flow set point, as shown at 48, and the DUT flow and pressure within the vessel 16 is allowed to reach a steady state, as shown at 50.

Once a steady state is reached, the MFV valve 20 is closed and temperature and pressure measurements T, P within the predetermined volume of the vessel 16 at time t=0 are recorded, as shown at 52. Then, temperature and pressure measurements T, P within the predetermined volume of the vessel 16 are recorded at predetermined intervals until time t=N, as shown at 54. According to one exemplary embodiment, the predetermined intervals are equal to about 0.00025 seconds each, and N is equal to 0.1 seconds. At time t=N, the MFV valve 20 is opened, as shown at 56, to allow flow to the vacuum pump.

A time derivative of the vessel pressure divided by the vessel temperature, $\Delta(P/T)/\Delta t$ is calculated based on the measurements of temperature and pressure within the predetermined volume of the vessel 16 from t=0 to t=N, as shown at 58, and a flow rate produced by the DUT based upon the time derivatives of temperature and pressure within the predetermined volume of the vessel 16 from t=0 to t=N is calculated, as shown at 60 of FIG. 5.

The flow rate Q is calculated by the controller 24 using:

$$Q = (V_{vessel} T_{STP}/P_{STP})(\Delta(P/T)/\Delta t)$$

where $V_{vessel}$ is the predetermined volume of the vessel 16, $T_{STP}$ is standard temperature of 0° C. (273.15 K), $P_{STP}$ is standard pressure of 1 atm (defined as 101.325 kPa), and $\Delta(P/T)/\Delta t$ is a time derivative of the vessel pressure divided by the vessel temperature based on the temperature and pressure measurements within the predetermined volume of the vessel from t=0 to t=N.

According to one exemplary embodiment, the method further comprises repeating the flow calculation steps of 42–60 of FIG. 5, s times in order to increase accuracy, as shown at 62, 64, and 66, and an average flow rate produced by the DUT through s times is calculated as shown at 68.

Figure 6:
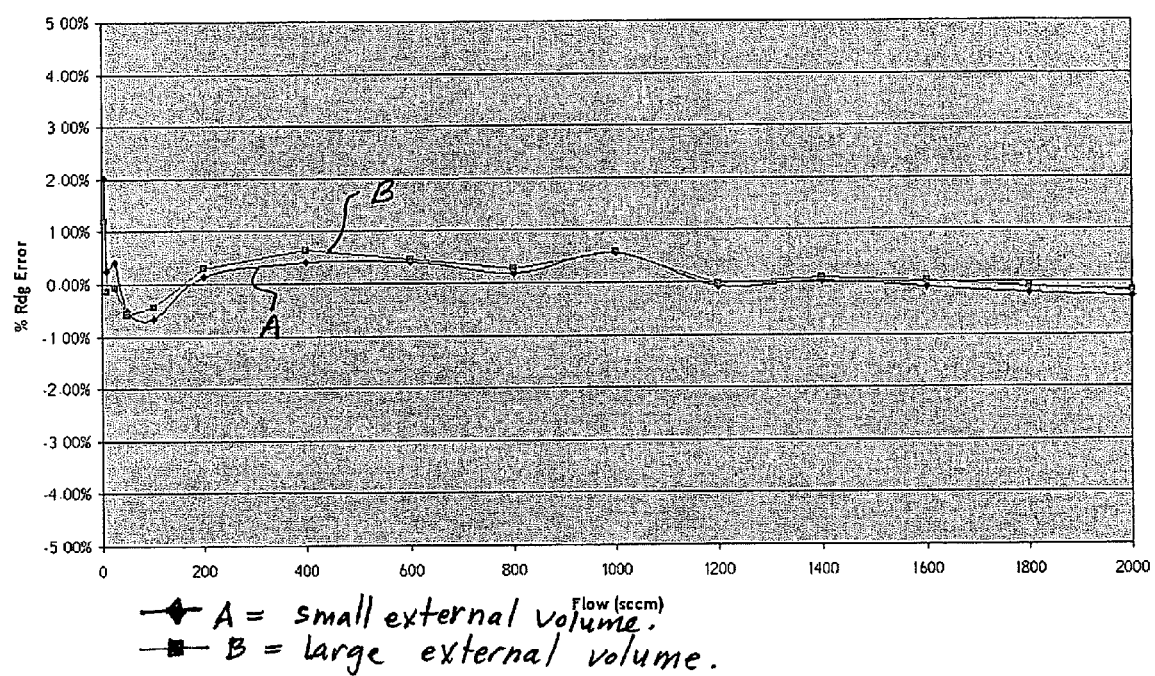
FIG. 6 is a graph showing the results of two flow verifications conducted by the flow verifier of FIG. 4 and the method of FIG. 5, wherein the flow verifications are conducted through external volumes of varying sizes, and wherein the results illustrate the substantial insensitivity of the system and the method of the present disclosure to external volumes.

FIG. 6 is a graph of verification reading errors versus flow rate of two flow verifications conducted by the flow verifier 10 of FIG. 4 and the method 40 of FIG. 5, wherein the flow verifications are conducted through external volumes A, B of varying sizes. In the example of FIG. 6, external volume A is relatively small while external volume B is relatively large. As shown, the reading errors produced for the two volumes A, B are substantially equal, demonstrating the relative insensitivity of the verifier 10 and the method 40 of the present disclosure to the size of the external volume.

Referring again to FIG. 4, the predetermined volume of the vessel 16 is less than 20 cc according to one exemplary embodiment of the disclosure. This compares to a typical vessel in a ROR mass flow verifier of the prior art which has a volume of between 200 cc and 2000 cc. Thus, a mass flow verifier 10 according to the present disclosure provides accurate flow measurements while having a relatively small vessel 16.

As shown in FIG. 4, the flow verifier 10 can also include a bypass valve 26 connected between the inlet 12 and the outlet 14 in parallel with the diffusive media 18, the vessel 16, and the outlet valve 20. Although not shown, the flow verifier 10 can further include an inlet valve located between the inlet 12 and the diffusive media 18, if desired. Neither the bypass valve nor the inlet valve are necessary, however, and may be left out of the verifier 10 to reduce the costs and the size of the verifier.

The present disclosure, therefore, provides a new and improved flow verifier for verifying and, if desired, calibrating flow control devices in a gas metering system. The new and improved flow verifier employs the ROR method to verify flow and provides in-situ verification of flow control devices. Moreover, the new and improved, in-situ flow verifier is small in size relative to prior existing ROR flow verifiers, and provides relatively fast and accurate flow measurements. Furthermore, the new and improved, in-situ flow verifier is substantially insensitive to the size of the external (connecting) volume located between the verifier and the device under test.

While there have been illustrated and described particular embodiments of the present disclosure, it will be appreciated that numerous changes and modifications will occur to those skilled in the art. Accordingly, it is intended that the appended claims cover all those changes and modifications which fall within the spirit and scope of the present disclosure.

What is claimed is:

1. A flow verifier for in-situ verification of a device under test (DUT), comprising:
   an inlet connectable to a DUT;
   an outlet connectable to a vacuum pump for drawing gas through the DUT and the flow verifier;
   a vessel having a predetermined volume;
   an outlet valve connecting the vessel to the outlet for controlling flow from the vessel to the outlet;
   at least one temperature sensor operatively connected to the vessel for providing temperature measurements from within the vessel;
   a pressure transducer operatively connected to the vessel for providing pressure measurements from within the vessel; and diffusive media connecting the inlet to the vessel, wherein a diffusion time coefficient along an axial length of the media is much greater than the response time of the pressure transducer.

2. A flow verifier according to claim 1, wherein the diffusive media comprises a capillary tube.

3. A flow verifier according to claim 1, wherein the diffusive media comprises a porous plug.

4. A flow verifier according to claim 1, wherein the diffusive media comprises a plurality of spaced flow restrictors connected in series.

5. A flow verifier according to claim 1, wherein the at least one temperature sensor comprises two or more temperature sensors adapted to provide an average temperature measurement from within the vessel.

6. A flow verifier for in-situ verification of a device under test (DUT), comprising:
an inlet connectable to a DUT;
an outlet connectable to a vacuum pump for drawing gas through the DUT and the flow verifier;
a vessel having a predetermined volume;
diffusive media connecting the inlet to the vessel;
an outlet valve connecting the vessel to the outlet for controlling flow from the vessel to the outlet;
at least one temperature sensor operatively connected to the vessel for providing temperature measurements from within the vessel;
a pressure transducer operatively connected to the vessel for providing pressure measurements from within the vessel; and
a controller connected to the temperature sensor, the pressure transducer and the valve and including a timer, wherein, upon the flow verifier being connected between the DUT and the vacuum pump, the vacuum pump being operated, and the DUT being provided with a flow set point, the controller is programmed to:
open the valve;
allow flow and pressure within the vessel to reach a steady state;
close the valve and record temperature and pressure measurements T, P within the predetermined volume of the vessel at time t=0;
record temperature and pressure measurements T, P within the predetermined volume of the vessel at predetermined intervals until time t=N;
calculate a time derivative of the vessel pressure divided by the vessel temperature, $\Delta(P/T)/\Delta t$, based on the temperature and pressure measurements within the predetermined volume of the vessel from t=0 to t=N; and
calculate a flow rate produced by the DUT based upon the time derivatives of temperature and pressure within the predetermined volume of the vessel from t=0 to t=N.

7. A flow verifier according to claim 6, wherein the controller is further programmed to repeat the flow calculation steps s times and then calculate an average flow rate produced by the DUT through s times.

8. A flow verifier according to claim 6, wherein the flow rate Q is calculated by the controller using:

$$Q = (V_{vessel} T_{STP}/P_{STP})(\Delta(P/T)/\Delta t)$$

where $V_{vessel}$ is the predetermined volume of the vessel, $T_{STP}$ is standard temperature of 0° C. (273.15 K), $P_{STP}$ is standard pressure of 1 atm (defined as 101.325 kPa), and $\Delta(P/T)/\Delta t$ is a time derivative of the vessel pressure divided by the vessel temperature based on the temperature and pressure measurements within the predetermined volume of the vessel from t=0 to t=N.

9. A flow verifier according to claim 1, wherein the predetermined volume of the vessel is less than 20 cc.

10. A flow verifier according to claim 1, further comprising a bypass valve connected between the inlet and the outlet in parallel with the diffusive media, the vessel, and the outlet valve.

11. A method for in-situ flow verification of a device under test (DUT), the method comprising:
connecting a flow verifier including a controller including a timer and a vessel having a predetermined volume between the DUT and a vacuum pump, the flow verifier further being connected to a temperature sensor, a pressure transducer, and a valve;
diffusing flow between the vessel and the DUT;
operating the vacuum pump such that gas is drawn through the DUT and the vessel;
providing the DUT with a flow set point and allowing flow and pressure within the vessel to reach a steady state;
stopping flow between the vessel and the vacuum pump by closing the valve;
recording temperature and pressure measurements T, P within the predetermined volume of the vessel at time t=0;
recording temperature and pressure measurements T, P within the predetermined volume of the vessel at predetermined intervals until time t=N;
calculating a time derivative of the vessel pressure divided by the vessel temperature, $\Delta(P/T)/\Delta t$, based on the temperature and pressure measurements within the predetermined volume of the vessel from t=0 to t=N;
calculating a flow rate produced by the DUT based upon the time derivatives of temperature and pressure within the predetermined volume of the vessel from t=0 to t=N; and
utilizing the flow rate in the controller for operation of the flow verifier.

12. A method according to claim 11, wherein the flow calculation steps are repeated s times, and an average flow rate produced by the DUT is calculated through s times.

13. A method according to claim 11, wherein the flow rate Q is calculated using:

$$Q = (V_{vessel} T_{STP}/P_{STP})(\Delta(P/T)/\Delta t)$$

where $V_{vessel}$ is the predetermined volume of the vessel, $T_{STP}$ is standard temperature of 0° C. (273.15 K), $P_{STP}$ is standard pressure of 1 atm (defined as 101.325 kPa), and $\Delta(P/T)/\Delta t$ is a time derivative of the vessel pressure divided by the vessel temperature based on the temperature and pressure measurements within the predetermined volume of the vessel from t=0 to t=N.

14. A method according to claim 11, the predetermined volume of the vessel is less than 20 cc.

15. A method according to claim 11, wherein the flow between the vessel and the DUT is diffused using a capillary tube.

16. A method according to claim 11, wherein the flow between the vessel and the DUT is diffused using a porous plug.

17. A method according to claim 11, wherein the flow between the vessel and the DUT is diffused using a plurality of spaced flow restrictors connected in series.

18. A method according to claim 11, wherein the temperature measurements from within the vessel comprise average temperature measurements computed from temperature measurements simultaneously taken at multiple positions within the predetermined volume of the vessel.

19. A flow verifier for in-situ verification of a device under test (DUT), comprising:

an inlet connectable to a DUT;

an outlet connectable to a vacuum pump for drawing gas through the DUT and the flow verifier;

a vessel having a predetermined volume connected to the inlet;

an outlet valve connecting the vessel to the outlet for controlling flow from the vessel to the outlet;

at least one temperature sensor operatively connected to the vessel for providing temperature measurements from within the vessel;

a pressure transducer operatively connected to the vessel for providing pressure measurements from within the vessel; and a controller connected to the temperature sensor, the pressure transducer and the valve and including a timer, wherein, upon the flow verifier being connected between the DUT and the vacuum pump, the vacuum pump being operated, and the DUT being provided with a flow set point, the controller is programmed to:

open the valve;

allow flow and pressure within the vessel to reach a steady state;

close the valve and record temperature and pressure measurements T, P within the predetermined volume of the vessel at time t=0;

record temperature and pressure measurements T, P within the predetermined volume of the vessel at predetermined intervals until time t=N;

calculate a time derivative of the vessel pressure divided by the vessel temperature, $\Delta(P/T)/\Delta t$, based on the temperature and pressure measurements within the predetermined volume of the vessel from t=0 to t=N; and calculate a flow rate produced by the DUT based upon the time derivatives of temperature and pressure within the predetermined volume of the vessel from t=0 to t=N, wherein the flow rate Q is calculated using:

$$Q = (V_{vessel} T_{STP}/P_{STP})(\Delta(P/T)/\Delta t)$$

where $V_{vessel}$ is the predetermined volume of the vessel, $T_{STP}$ is standard temperature of 0° C. (273.15 K), $P_{STP}$ is standard pressure of 1 atm (defined as 101.325 kPa), and $\Delta(P/T)/\Delta t$ is a time derivative of the vessel pressure divided by the vessel temperature based on the temperature and pressure measurements within the predetermined volume of the vessel from t=0 to t=N.

20. A flow verifier according to claim 19, wherein a capillary tube connects the vessel to the inlet.

* * * * *